(12) United States Patent
Paulus et al.

(10) Patent No.: US 12,509,544 B2
(45) Date of Patent: Dec. 30, 2025

(54) AQUEOUS BINDER FORMULATION

(71) Applicant: BASF SE, Ludwigshafen am Rhein (DE)

(72) Inventors: Wolfgang Paulus, Ludwigshafen (DE); Hans Horler, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 746 days.

(21) Appl. No.: 17/288,170

(22) PCT Filed: Oct. 18, 2019

(86) PCT No.: PCT/EP2019/078308
§ 371 (c)(1),
(2) Date: Apr. 23, 2021

(87) PCT Pub. No.: WO2020/083755
PCT Pub. Date: Apr. 30, 2020

(65) Prior Publication Data
US 2021/0380751 A1    Dec. 9, 2021

(30) Foreign Application Priority Data
Oct. 26, 2018  (EP) .................... 18202750

(51) Int. Cl.
| | | |
|---|---|---|
| *C08G 18/32* | (2006.01) |
| *C08G 18/10* | (2006.01) |
| *C08G 18/34* | (2006.01) |
| *C08G 18/42* | (2006.01) |
| *C08G 18/48* | (2006.01) |
| *C08G 18/75* | (2006.01) |
| *C08G 18/79* | (2006.01) |
| *D06M 15/564* | (2006.01) |

(52) U.S. Cl.
CPC ......... *C08G 18/10* (2013.01); *C08G 18/3206* (2013.01); *C08G 18/348* (2013.01); *C08G 18/4216* (2013.01); *C08G 18/4825* (2013.01); *C08G 18/755* (2013.01); *C08G 18/792* (2013.01); *D06M 15/564* (2013.01); *C08G 2150/00* (2013.01); *C08G 2170/00* (2013.01); *C08G 2190/00* (2013.01)

(58) Field of Classification Search
CPC .. C08G 18/10; C08G 18/3206; C08G 18/348; C08G 18/4216; C08G 18/4825; C08G 18/755
See application file for complete search history.

(56) References Cited

U.S. PATENT DOCUMENTS

| | | | |
|---|---|---|---|
| 4,101,602 A | 7/1978 | Fabris et al. | |
| 5,767,188 A * | 6/1998 | Kamikuri | C09D 151/06 524/840 |
| 2003/0158324 A1* | 8/2003 | Maxim, Jr. | C09D 7/43 524/563 |
| 2010/0160480 A1* | 6/2010 | Tomko | C08G 18/758 522/174 |
| 2010/0323202 A1* | 12/2010 | Burckhardt | C09J 5/00 524/169 |
| 2015/0307738 A1* | 10/2015 | Schmucker | C08G 18/348 428/423.1 |
| 2016/0068706 A1* | 3/2016 | Swarup | C09D 5/29 427/407.1 |
| 2021/0122871 A1* | 4/2021 | Salviato | C08G 18/10 |

FOREIGN PATENT DOCUMENTS

| | | |
|---|---|---|
| EP | 0332326 A2 | 9/1989 |
| WO | 2012026475 A1 | 3/2012 |
| WO | 2016000989 A1 | 1/2016 |
| WO | 2018146142 A1 | 8/2018 |

OTHER PUBLICATIONS

WO-2012/026475_Takehashi et al._ English Translation.*
Jantas, et al., "Esterification of poly(vinyl alcohol) with methacryloyl chloride", Acta Polymerica, vol. 35, Issue 2, Feb. 1984, pp. 150-152.
International Search Report for corresponding PCT/EP2019/078308 mailed Jan. 31, 2020, 2 Pages.

* cited by examiner

*Primary Examiner* — Michael L Leonard
(74) *Attorney, Agent, or Firm* — Armstrong Teasdale LLP

(57) ABSTRACT

Described herein are aqueous binder formulations including organic compounds including acryloyloxy groups and carboxylic acid hydrazides.

16 Claims, No Drawings

AQUEOUS BINDER FORMULATION

CROSS-REFERENCE TO RELATED APPLICATIONS

This application is a U.S. National Phase Application of International Patent Application No. PCT/EP2019/078308, filed Oct. 18, 2019, which claims the benefit of priority to European Patent Application No. 18202750.8, filed Oct. 26, 2018, the entire contents of which are hereby incorporated by reference herein.

The present invention relates to an aqueous binder formulation comprising
a) at least one organic compound A, and
b) at least one carboxylic acid hydrazide B, wherein
the at least one organic compound A
a1) has at least two optionally substituted acryloyloxy groups, and
a2) does not comprise any aldehydic and/or ketonic carbonyl groups.

The present invention also relates to a process for producing said aqueous formulation and also to the production thereof and use thereof.

When using hydrazides in binder formulations, the following prior art can be assumed.

For instance, EP-A 332326 discloses aqueous coating systems, the binder of which is a polyurethane polymer having both carbonyl groups and hydrazide groups.

According to WO 2016/000989, one- or two-component coating compositions are disclosed comprising specific two-stage dispersion polymers and optionally also a polyurethane as binder. In the case that the two-stage dispersion polymers have keto, aldehyde and/or acetoacetoxy-carbonyl groups, it is pointed out that the coating compositions may also comprise crosslinking agents such as, inter alia, organic compounds having two or more hydrazide groups, such as adipic acid dihydrazide, oxalic acid dihydrazide, phthalic acid hydrazide and terephthalic acid hydrazide for example.

It was therefore an object of the present invention to provide an alternative binder formulation based on hydrazide compounds which does not require reaction components containing carbonyl groups.

The object was achieved by providing the binder formulation defined at the outset.

An essential constituent of the present aqueous binder formulation is at least one organic compound A, which
a1) has at least two optionally substituted acryloyloxy groups, and
a2) does not comprise any aldehydic and/or ketonic carbonyl groups.

In accordance with the invention, it is irrelevant whether the organic compound A is a molecular organic compound having a molecular weight ≤500 g/mol or is a polymeric organic compound having a number average molecular weight >500 g/mol, although preference is given to polymeric organic compound having a number average molecular weight >500 g/mol. Polymeric organic compounds A generally have number average molecular weights in the range >500 and ≤500 000 g/mol, advantageously ≥600 and ≤10 000 g/mol and particularly advantageously ≥750 and ≤3000 g/mol. In the context of the present invention, the number average molecular weight should be determined here by gel permeation chromatography using defined polystyrene standards.

It is essential that the organic compound A has at least two optionally substituted acryloyloxy groups, where the molecular compounds A generally have ≥2 and ≤5, advantageously ≥2 and ≤4 and particularly advantageously ≥2 and ≤3 optionally substituted acryloyloxy groups. The polymeric compounds A generally have on average ≥2 and ≤10, advantageously ≥2 and ≤5 and particularly advantageously ≥2 and ≤3 optionally substituted acryloyloxy groups.

According to the invention, the optionally substituted acryloyloxy groups have the structure of the following formula I

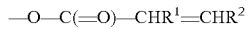  Formula I, where
$R^1$ is hydrogen, $C_1$-$C_4$-alkyl, —C(=O)—O—$C_1$-$C_4$-alkyl or —CH$_2$—C(=O)—O—$C_1$-$C_4$-alkyl, preferably hydrogen and methyl and particularly preferably hydrogen, and
$R^2$ is hydrogen, $C_1$-$C_4$-alkyl, —C(=O)—O—$C_1$-$C_4$-alkyl or —C≡N and preferably hydrogen.

In the context of the present specification, $C_1$-$C_4$-alkyl is methyl, ethyl, n-propyl, isopropyl, n-butyl, sec-butyl, isobutyl or tert-butyl, where preference is given to methyl and ethyl and particular preference is given to methyl.

The molecular compounds A are advantageously compounds having the structure of formula II:

  Formula II, wherein they are very generally molecular diol or polyol compounds of the general formula III

  Formula III, of which the OH groups have been replaced by an optionally substituted acryloyloxy group (Z) according to formula I and where R is an at least divalent non-polymeric organic radical and n is a number ≥2.

In this case, the molecular diol or polyol compounds of the general formula III used can be both aromatic and aliphatic in structure, preference being given to those having an aliphatic structure.

Aromatic molecular diol or polyol compounds are those comprising at least one aromatic ring system, i.e. both purely aromatic and araliphatic compounds.

In the case of aliphatic molecular diol or polyol compounds, both acyclic and cycloaliphatic compounds are suitable.

Cycloaliphatic molecular diol or polyol compounds are those comprising at least one cycloaliphatic ring system, whereas acyclic molecular diol or polyol compounds have exclusively straight or branched non-cyclic hydrocarbon radicals. Aliphatic molecular diol or polyol compounds do not comprise any aromatic ring systems.

Examples of molecular acyclic diol compounds of the general formula III include: ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, heptane-1,7-diol, octane-1,8-diol, octane-1,2-diol, nonane-1,9-diol, decane-1,2-diol, decane-1,10-diol, dodecane-1,2-diol, dodecane-1,12-diol, 1,5-hexadiene-3,4-diol, 2,2-dimethylpropane-1,3-diol (neopentyl glycol), 2-methylpentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol and/or tripropylene glycol.

Preferred molecular acyclic diol components are ethylene glycol, propane-1,2-diol, propane-1,3-diol, butane-1,4-diol, pentane-1,5-diol, hexane-1,6-diol and/or octane-1,8-diol.

Examples of cycloaliphatic diols are cyclopentane-1,2- and -1,3-diols, cyclohexane-1,2-, -1,3- and -1,4-diols, 1,1-, 1,2-, 1,3- and 1,4-bis(hydroxymethyl)cyclohexanes, 1,1-, 1,2-, 1,3- and 1,4-bis(hydroxyethyl)cyclohexanes and bis(4-hydroxycyclohexane)isopropylidene.

Preference is given to cyclohexane-1,2-, -1,3- and -1,4-diol, 1,3- and 1,4-bis(hydroxymethyl)cyclohexane and bis (4-hydroxycyclohexane)isopropylidene.

Molecular compounds having more than two hydroxyl groups include, for example: trimethylolbutane, trimethylolpropane, trimethylolethane, pentaerythritol, glycerol, ditrimethylolpropane, dipentaerythritol, ditrimethylolethane, sorbitol, mannitol, diglycerol, threitol, erythritol, adonitol (ribitol), arabitol (lyxitol), xylitol, dulcitol (galactitol), maltitol or isomalt.

The description of the general preparation of the molecular compounds A from the molecular diol compounds and the molecular compounds having more than two hydroxyl groups will be given later.

In the context of the present invention, suitable polymeric compounds A are all naturally occurring or synthetically produced polymers which have at least two optionally substituted acryloyloxy groups (Z). Examples of polymeric compounds A based on natural substances are appropriately functionalized nitrocelluloses, cellulose esters, colophony, shellac, linseed oil and/or wood oil. Synthetically produced polymeric compounds A include, for example, appropriately functionalized polycondensation products, such as alkyd resins, polyesters, polyethers, polycarbonates, polyamides, silicone resins and/or epoxy resins, and polyaddition products for example, such as polyurethanes and polymers for example which are composed of ethylenically unsaturated compounds in polymerized form. These polycondensation compounds and polyaddition compounds are produced by production processes familiar to those skilled in the art.

The polymeric compounds A are also advantageously produced from the corresponding polymeric precursors having at least two hydroxyl groups such as, in particular, homopolymers or copolymers of vinyl alcohol, copolymers of 2-hydroxyethyl acrylate or methacrylate, and at least two hydroxyl group-containing polyesters, polyethers or polycarbonates.

In this case, the preparation of homopolymers or copolymers of vinyl alcohol is familiar to those skilled in the art and is generally carried out by metal complex-catalyzed, anionically catalyzed, cationically catalyzed and particularly preferably by free-radically catalyzed homo- or copolymerization of vinyl alcohol or by free-radically induced homo- or copolymerization of vinyl acetate with subsequent partial or complete hydrolytic cleavage of the acetate groups.

The preparation of the copolymers of 2-hydroxyethyl acrylate or methacrylate is also familiar to those skilled in the art and is generally carried out by metal complex-catalyzed, anionically catalyzed, cationically catalyzed and particularly preferably by free-radically catalyzed copolymerization of 2-hydroxyethyl acrylate or methacrylate with other ethylenically unsaturated compounds such as, for example, ethylene, vinyl aromatic monomers such as styrene, α-methylstyrene, o-chlorostyrene or vinyltoluenes, vinyl halides such as vinyl chloride or vinylidene chloride, esters derived from vinyl alcohol and monocarboxylic acids having 1 to 18 carbon atoms, such as vinyl acetate, vinyl propionate, vinyl n-butyrate, vinyl laurate and vinyl stearate, esters derived from α,β-monoethylenically unsaturated mono- and dicarboxylic acids preferably having 3 to 6 carbon atoms, such as in particular acrylic acid, methacrylic acid, maleic acid, fumaric acid and itaconic acid, with alkanols generally having 1 to 12, preferably 1 to 8 and especially 1 to 4 carbon atoms, such as, in particular, the methyl, ethyl, n-butyl, isobutyl, pentyl, hexyl, heptyl, octyl, nonyl, decyl and 2-ethylhexyl esters of acrylic acid and of methacrylic acid, the dimethyl or di-n-butyl esters of fumaric acid and of maleic acid, nitriles of α,β-monoethylenically unsaturated carboxylic acids such as acrylonitrile, methacrylonitrile, fumaronitrile, maleonitrile and also $C_{4-8}$-conjugated dienes such as 1,3-butadiene and isoprene.

Advantageously used as at least two hydroxyl group-containing polyesters, polyethers or polycarbonates, so-called polyesterols, polyetherols or polycarbonatols, are those polymeric compounds of which the OH number, measured in accordance with DIN EN ISO 4629-1, is in the range of ≥40 and ≤400 mg KOH/g of polymer, preferably in the range of ≥40 and ≤200 mg KOH/g of polymer and of which the acid number, measured in accordance with DIN 53240, is in the range of <20 mg KOH/g of polymer.

The polyetherols that may be used as precursors are advantageously essentially polyalkylene oxides of the general formula $HO[AO]_mH$, where AO is ethylene oxide, propylene oxide, 1,2-epoxybutane and/or 2,3-epoxybutane and m is a number ≥8. The alkylene oxides can in each case be used individually and/or as a mixture in the preparation of the polyalkylene oxides by acid- or base-catalyzed reaction with water, wherein polyalkylene glycols which are formed from only one alkylene oxide, such as in particular polyethylene glycols or polypropylene glycols, or are formed from two or more alkylene oxides, wherein the polyalkylene glycols obtained thereby comprise the respective two or more alkylene oxides—depending on the preparation variant—in a statistical mixture or in the form of blocks. The polyetherols which can be used as polymeric precursors also include polytetramethylene glycols, which are accessible by acid-catalyzed polymerization of tetrahydrofuran. Those skilled in the art are familiar with the corresponding methods of preparation of the aforementioned polyetherols.

Polycarbonatols, i.e. hydroxy-functionalized polycarbonates, are accessible, inter alia, by reacting the molecular diol or polyol components described above, in particular the aliphatic diol components and particularly preferably the acyclic diol components, with phosgene or diethyl carbonate or dimethyl carbonate, with removal of hydrochloric acid or of ethanol or methanol.

Polycarbonatols based on ethylene glycol and/or neopentyl glycol are advantageously used as polycarbonates comprising at least two hydroxyl groups.

The polyesterols which can advantageously be used as hydroxy-functionalized polymeric precursors are in principle accessible by reacting monomeric or polymeric diols or polyols with dicarboxylic acid components, polyesterols based on monomeric aliphatic diols, in particular based on monomeric acyclic diols, being advantageous.

The dicarboxylic acid units may be the free dicarboxylic acids or derivatives thereof.

Derivatives are preferably understood to mean
  the corresponding anhydrides in monomeric or else polymeric form, monoalkyl or dialkyl esters, preferably mono- or di-$C_1$-$C_4$-alkyl esters, particularly preferably monomethyl or dimethyl esters or the corresponding monoethyl or diethyl esters,
  or else mono- and divinyl esters, and also
  mixed esters, preferably mixed esters with different $C_1$-$C_4$-alkyl components, particularly preferably mixed methyl ethyl esters.

Examples of molecular acyclic diols include: ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, heptane-1,7-diol, octane-1,8-diol, octane-1,2-diol, nonane-1,9-diol, decane-1,2-diol, decane-1,10-diol, dodecane-1,2-diol, dodecane-1,12-diol, 1,5-hexadiene-3,4-diol, 2,2-dimethylpropane-1,3-diol, 2-methyl pentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol and/or tripropylene glycol.

Molecular acyclic diols used with preference are ethylene glycol, propane-1,2-diol, propane-1,3-diol, butane-1,4-diol, pentane-1,5-diol, hexane-1,6-diol, 2,2-dimethylpropane-1,3-diol and/or octane-1,8-diol.

Examples of cycloaliphatic diols are cyclopentane-1,2- and -1,3-diols, cyclohexane-1,2-, -1,3- and -1,4-diols, 1,1-, 1,2-, 1,3- and 1,4-bis(hydroxymethyl)cyclohexanes, 1,1-, 1,2-, 1,3- and 1,4-bis(hydroxyethyl)cyclohexanes and bis(4-hydroxycyclohexane)isopropylidene.

Preferred cycloaliphatic diols are cyclohexane-1,2-, -1,3- and -1,4-diol, 1,3- and 1,4-bis(hydroxymethyl)cyclohexane and bis(4-hydroxycyclohexane)isopropylidene.

The polymeric diols are essentially the polyalkylene oxides of the general formula $HO[AO]_mH$ described above, where AO is ethylene oxide, propylene oxide, 1,2-epoxybutane and/or 2,3-epoxybutane and m is a number 8. If such polymeric diols are used to prepare the polyesterols, the corresponding polyethylene glycols are used in particular.

To prepare the polyesterols, however, preference is given to using the acyclic diols ethylene glycol, propane-1,2-diol, propane-1,3-diol, butane-1,4-diol, pentane-1,5-diol, hexane-1,6-diol, 2,2-dimethylpropane-1,3-diol and/or octane-1,8-diol.

In the case of the dicarboxylic acid units, it is advantageous to use free dicarboxylic acids or anhydrides thereof, it being possible for these to have either an aromatic or an aliphatic structure. In the case of aliphatic dicarboxylic acids, both those with an acyclic structure and those with a cycloaliphatic structure are used.

Examples of dicarboxylic acids having an acyclic structure are $C_2$-$C_{16}$-diacids such as, in particular, oxalic acid, malonic acid, maleic acid, fumaric acid, succinic acid, glutaric acid, adipic acid, pimelic acid, suberic acid, azelaic acid, sebacic acid, undecanedioic acid, dodecanedioic acid.

Examples of cycloaliphatic dicarboxylic acids are cis- and trans-cyclohexane-1,2-dicarboxylic acid (hexahydrophthalic acids), cis- and trans-cyclohexane-1,3-dicarboxylic acid, cis- and trans-cyclohexane-1,4-dicarboxylic acid, 1,2-, 1,3- or 1,4-cyclohex-4-enedicarboxylic acid (tetrahydrophthalic acids), cis- and trans-cyclopentane-1,2-dicarboxylic acid, cis- and trans-cyclopentane-1,3-dicarboxylic acid.

Examples of aromatic dicarboxylic acids are phthalic acid, isophthalic acid, terephthalic acid and phthalic anhydride, preference being given to phthalic acid and isophthalic acid, particular preference to phthalic acid.

Dicarboxylic acid units advantageously used are succinic acid, adipic acid, sebacic acid, maleic acid, fumaric acid, phthalic acid, isophthalic acid, terephthalic acid and/or phthalic anhydride.

According to the invention, particularly advantageous are polyesterols based on hexane-1,6-diol, ethylene glycol, propylene-1,2-diol and/or neopentyl glycol as the diol component and adipic acid, phthalic acid, isophthalic acid and/or sebacic acid as the dicarboxylic acid component, wherein particular preference is given to polyesterols based on hexane-1,6-diol, adipic acid and isophthalic acid, hexane-1,6-diol, adipic acid and phthalic acid and/or on propylene-1,2-diol, butane-1,4-diol and adipic acid.

It is essential that both the molecular and the polymeric compounds A are advantageously accessible from the corresponding aforementioned molecular as well as the aforementioned polymeric hydroxyl group-containing compounds in a simple manner by reaction with the appropriate amounts of acryloyl chloride or methacryloyl chloride with removal of hydrogen chloride in a simple manner according to the following reaction equation:

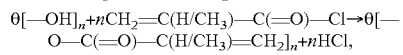

where

θ: is an at least divalent molecular or polymeric organic radical, and n: is a number ≥2.

Corresponding reactions are familiar to those skilled in the art (see, for example, R. Jantas, S. Polowinski: Esterification of poly(vinyl alcohol) with methacryloyl chloride, in Acta Polym. Volume 35, No. 2, 1984, pages 150 to 152).

The molecular as well as the polymeric compounds A can be prepared under reaction conditions by reacting the aforementioned molecular or polymeric hydroxyl group-containing compounds with the appropriate amounts of acryloyl chloride or methacryloyl chloride without solvent or advantageously in the presence of an inert organic solvent familiar to those skilled in the art. The inert organic solvents used are particularly those organic solvents in which the amounts of molecular or polymeric hydroxyl group-containing compounds and acryloyl chloride or methacryloyl chloride used and the resulting molecular or polymeric compounds A are at least partially, advantageously completely soluble at the reaction temperature, and which do not react with the hydroxyl group-containing compounds, acryloyl chloride or methacryloyl chloride and the compounds A obtained at the reaction temperature. Examples of such organic solvents used are polar, aprotic organic solvents having a boiling point in the range of ≥40 and ≤170° C. and advantageously in the range of 60 and ≤130° C., at atmospheric pressure (1.013 bar absolute), such as in particular ketones such as acetone, methyl ethyl ketone, methyl isobutyl ketone, methyl tert-butyl ketone, alkyl alkanoates such as ethyl acetate, n-propyl acetate, isopropyl acetate, n-butyl acetate, tertbutyl acetate, methyl propionate or ethyl propionate.

In a further embodiment, molecular and polymeric compounds A can in principle also be obtained by reacting the corresponding molecular or polymeric di- or polycarboxylic acid compounds with glycidyl (meth)acrylates according to the following reaction equation:

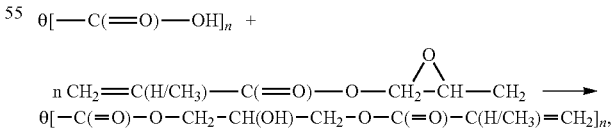

where θ and n have the definitions specified above. In this case the reaction may be carried out without solvent and advantageously in a suitable organic solvent.

In an advantageous embodiment, after the preparation of the molecular or polymeric compound A, the organic solvent is replaced by water in a manner familiar to those skilled in the art (addition of water and distilling off the organic solvent), wherein an aqueous solution, emulsion and/or dispersion of the at least one compound A is formed.

In addition to the at least one organic compound A, the aqueous binder formulation according to the invention also comprises a carboxylic acid hydrazide B.

According to the invention, the carboxylic acid hydrazides B used are either monocarboxylic acid hydrazides or, advantageously, dicarboxylic acid dihydrazides, which are derived from aliphatic, aromatic and heterocyclic mono- and dicarboxylic acids. In this case, the monocarboxylic acid monohydrazides and dicarboxylic acid dihydrazides are advantageously prepared by reacting the corresponding monocarbonyl halides and dicarbonyl dihalides, in particular the corresponding monocarbonyl chlorides and dicarbonyl dichlorides, with hydrazine.

Monocarboxylic acid hydrazides B which can be used according to the invention are advantageously compounds of the following formula $$R^3\text{—C}(\!\!=\!\!O)\text{—NH—NH}_2,$$

where
R$^3$ is hydrogen or a monovalent $C_1$-$C_{18}$-alkyl radical, $C_6$-$C_{12}$-aryl radical, $C_5$-$C_{12}$-cycloalkyl radical or a five- to six-membered heterocycle radical having at least one oxygen, nitrogen and/or sulfur atom, wherein these radicals may also have functional groups such as $C_1$-$C_{18}$-alkyl, $C_6$-$C_{12}$-aryl, $C_5$-$C_{12}$-cycloalkyl, halogen or five- to six-membered heterocycle groups having at least one oxygen, nitrogen and/or sulfur atom.

Examples of aliphatic monocarboxylic acid hydrazides B are the alicyclic compounds formic hydrazide [HC(=O)—NH—HN$_2$], acethydrazide [H$_3$C—C(=O)—NH—HN$_2$], propionyl hydrazide [H$_3$C—CH$_2$—C(=O)—NH—HN$_2$], butanoyl hydrazide [H$_3$C—(CH$_2$)$_2$—C(=O)—NH—HN$_2$], capryloyl hydrazide [H$_3$C—(CH$_2$)$_3$—C(=O)—NH—HN$_2$], the cycloaliphatich compounds cyclopentylcarboxylic acid hydrazide or cyclohexylcarboxylic acid hydrazide, and also amidooxalic acid hydrazide [H$_2$N—C(=O)—(C=O)NH—NH$_2$], the aromatic compounds benzoic acid hydrazide, 2-chlorobenzoic acid hydrazide, 2-nitrobenzoic acid hydrazide, 3-bromobenzoic acid hydrazide, 4-chlorobenzoic acid hydrazide, 4-nitrobenzoic acid hydrazide, 4-bromobenzoic acid hydrazide, 4-aminobenzoic acid hydrazide, 4-hydroxybenzoic acid hydrazide, 4-methylbenzoic acid hydrazide, phenylacetic acid hydrazide, salicylic acid hydrazide, L-tyrosine hydrazide, 3-hydroxynaphthyloyl hydrazide, nicotinic acid hydrazide, pyrrolidine-2-carboxylic acid hydrazide or 1-acetyl-2-phenylhydrazine.

Preferred monocarboxylic acid hydrazides B are acethydrazide and/or benzoic acid hydrazide, particular preference being given to acetic hydrazide.

Dicarboxylic acid dihydrazides B which can be used according to the invention are advantageously compounds of the following formula $$H_2N\text{—NH—C}(\!\!=\!\!O)\text{—}R^4\text{—C}(\!\!=\!\!O)\text{—NH—NH}_2,$$

where
R$^4$ is an acyclic, cycloaliphatic, aromatic or heterocyclic divalent radical having 1 to 20 carbon atoms.

R$^4$ is, for example, methylene, 1,2-ethylene, 1,2-propylene, 1,3-propylene, 1,2-butylene, 1,4-butylene, 1,3-butylene, 1,6-hexylene, 1,8-octylene, 1,12-dodecylene, 1,2-phenylene, 1,3-phenylene, 1,4-phenylene, 1,2-naphthylene, 1,3-naphthylene, 1,4-naphthylene, 1,6-naphthylene, 1,2-cyclopentylene, 1,3-cyclopentylene, 1,2-cyclohexylene, 1,3-cyclohexylene or 1,4-cyclohexylene.

Examples of aliphatic dicarboxylic acid dihydrazides B are the acyclic compounds oxalic acid dihydrazide, malonic acid dihydrazide, succinic acid dihydrazide, glutaric acid dihydrazide and adipic acid dihydrazide. Examples of aromatic dicarboxylic acid dihydrazides are phthalic acid dihydrazide, isophthalic acid dihydrazide or terephthalic acid dihydrazide.

It is important that, in accordance with the invention, the dihydrazide of carbonic acid, the carbodihydrazide [H$_2$N—NH—C(=O)—NH—NH$_2$] may also be used as the dihydrazide compound.

Preferred dicarboxylic acid dihydrazides B are the dihydrazides of aliphatic dicarboxylic acids, malonic acid dihydrazide or adipic acid dihydrazide being particularly preferred.

Advantageously in accordance with the invention, carboxylic acid hydrazides B are used having a solubility of ≥5 g/l, preferably ≥10 and particularly preferably ≥100 g/l of deionized water at 20° C. and 1.013 bar (absolute). Optionally, to increase the solubility of the carboxylic acid hydrazides B, aliphatic alcohols such as, in particular, methanol, ethanol and/or isopropanol, may be additionally used in amounts of ≤5% by weight, preferably ≤3% by weight, based in each case on the aqueous binder formulation.

In the aqueous binder formulations according to the invention, the type and amounts of the organic compound A and of the carboxylic acid hydrazide B are selected so that the equivalent molar ratio of the optionally substituted acryloyloxy groups of the at least one compound A to the hydrazide groups of the at least one carboxylic acid hydrazide B is in the range of ≥0.01 and ≤10, advantageously in the range of ≥0.5 and ≤5, preferably in the range of ≥0.8 and ≤3.3 and particularly advantageously in the range of ≥1 and ≤3.

It is essential that the aqueous binder formulations according to the invention comprise ≥20% by weight, advantageously ≥30% by weight and particularly advantageously ≥30% by weight of water and ≤5% by weight, advantageously ≤3% by weight and particularly advantageously ≤1% by weight of organic solvents. Correspondingly, the binder formulation according to the invention has a content of active binder components, formed from the sum of the at least one organic compound A and the at least one carboxylic acid hydrazide B, in the range of ≥5 and ≤75% by weight, advantageously in the range of ≥10 and ≤70% by weight and particularly advantageously in the range of ≥30 and ≤60% by weight.

The aqueous binder formulations according to the invention are storage-stable and are able to harden on application thereof by removal of water during drying, which is why they can be used advantageously as binders in the production of adhesives, sealants, renders, paper coating slips, fiber nonwovens, flexible roof coatings, printing inks and coating compositions, and in sand consolidation, as a component in the production of textile or leather auxiliaries and impact modifiers or to modify mineral binders and plastics.

The aqueous binder formulations can be produced in a simple manner by homogeneously mixing the organic compound A and the carboxylic acid hydrazide B in an aqueous medium in any sequence, it being possible for the production to be effected beforehand or during use of the aqueous binder formulations. The aqueous binder formulation is advantageously prepared prior to use thereof.

In a particularly preferred embodiment, the aqueous binder formulation is prepared in such a way that an aqueous solution, emulsion and/or dispersion of the at least one compound A is prepared in a first stage by replacing the organic solvent with water and the at least one carboxylic acid hydrazide B is added to this aqueous solution, emulsion and/or dispersion of the at least one compound A in a subsequent second stage. The second stage is advantageously carried out with homogeneous mixing.

Of course, in the context of the present invention, the aqueous binder formulations can, depending on the intended use, also comprise further customary auxiliaries, the type and amount of which are familiar to those skilled in the art, such as, for example, pigments, fillers, dyes, optical brighteners, retention agents, wetting agents, film-forming aids, defoamers, preservatives, biocides, slime control agents, plasticizers, antiblocking agents, antistatic agents, buffer substances, hydrophobizing agents etc.

The aqueous binder formulations according to the invention are particularly suitable as binders for fibrous and granular substrates.

Fibrous and granular substrates are familiar to those skilled in the art. For example, these are wood chips, wood fibers, textile fibers, glass fibers, mineral fibers or natural fibers such as jute, flax, hemp or sisal, but also cork chips or sand. Self-evidently, the term substrate should also include the fiber nonwovens obtainable from the fibers mentioned, for example so-called needled fiber nonwovens. The aqueous binder formulation according to the invention is particularly advantageously suitable as a formaldehyde-free binder system for the aforementioned natural fibers or fiber nonwovens formed therefrom.

The process for producing a shaped body from a fibrous or granular substrate using an aqueous binder formulation is carried out in such a way that the fibrous or granular substrate is first brought into contact (impregnated) with the aqueous binder formulation, and the impregnated fibrous or granular substrate is then brought to the desired shape and this form is then dried or cured.

The fibrous and granular substrates are generally impregnated in such a way that the aqueous binder formulation according to the invention is applied uniformly to the surface of the fibrous and granular substrates. In this case, the amount of aqueous binder formulation is selected so that, per 100 g of substrate, $\geq 1$ g and $\leq 100$ g, preferably $\geq 5$ g and $\leq 50$ g and particularly preferably $\geq 10$ g and $\leq 30$ g of aqueous binder formulation may be used, calculated as a solid (formed from the sum total of organic compound A and carboxylic acid hydrazide B). Impregnation of the fibrous and granular substrates is familiar to those skilled in the art and is carried out, for example, by impregnation or by spraying the fibrous or granular substrates.

Following impregnation, the fibrous or granular substrate is brought to the desired shape, for example by placing it in a heatable press or mold and this is then dried or cured in a manner familiar to those skilled in the art.

The shaped body obtained is often dried and cured at a temperature $\geq 0°$ C. and $\leq 130°$ C., preferably $\geq 10°$ C. and $\leq 100°$ C. and particularly preferably $\geq 15°$ C. and $\leq 50°$ C.

In this case, the drying and curing are advantageously carried out in such a way that the shaped body is dried at the specified temperature until the shaped body obtained has a residual moisture of $\leq 10\%$ by weight, preferably $\leq 3\%$ by weight and particularly preferably $\leq 0.5\%$ by weight, wherein the binder formulation cures as a result of a chemical reaction. Here, the residual moisture is determined by first weighing the shaped body obtained at room temperature, then drying it for 2 minutes at 130° C. and then cooling it and weighing it again at room temperature. Here, the residual moisture corresponds to the difference in weight of the shaped body before and after the drying process, based on the weight of the shaped body before the drying process, multiplied by the factor of 100.

The shaped bodies accessible by the process according to the invention have advantageous properties, in particular an improved flexural deformation and flexural stress behavior compared to the shaped bodies of the prior art.

The present document accordingly comprises the following embodiments in particular:

1. An aqueous binder formulation comprising
   a) at least one organic compound A, and
   b) at least one carboxylic acid hydrazide B, wherein the at least one organic compound A
   a1) has at least two optionally substituted acryloyloxy groups, and
   a2) does not comprise any aldehydic and/or ketonic carbonyl groups.
2. The aqueous binder formulation according to embodiment 1, wherein the optionally substituted acryloyloxy groups have the following structure $$-O-C(=O)-CHR^1=CHR^2,$$

where
   $R^1$ is hydrogen, $C_1$-$C_4$-alkyl, $-C(=O)-O-C_1$-$C_4$-alkyl or $-CH_2-C(=O)-O-C_1$-$C_4$-alkyl, and
   $R^2$ is hydrogen, $C_1$-$C_4$-alkyl, $-C(=O)-O-C_1$-$C_4$-alkyl or $-C\equiv N$.
3. The aqueous binder formulation according to embodiment 1 or 2, wherein the at least one compound A is a polymeric compound.
4. The aqueous binder formulation according to any of embodiments 1 to 3, wherein at least one carboxylic acid hydrazide B used is the dihydrazide of an aliphatic dicarboxylic acid.
5. The aqueous binder formulation according to any of embodiments 1 to 4, wherein the amounts of the at least one compound A and the at least one carboxylic acid hydrazide B are selected such that the equivalent molar ratio of the optionally substituted acryloyloxy groups of the at least one compound A to the hydrazide groups of the at least one carboxylic acid hydrazide B is in the range of $\geq 0.8$ and $\leq 3.3$.
6. The aqueous binder formulation according to any of embodiments 1 to 5, wherein said formulation comprises $\geq 20\%$ by weight water and $\leq 5\%$ by weight organic solvent.
7. A process for producing an aqueous binder formulation according to any of embodiments 1 to 6, wherein an aqueous solution, emulsion and/or dispersion of the at least one compound A is produced in a first stage and the at least one carboxylic acid hydrazide B is added to this aqueous solution, emulsion and/or dispersion of the at least one compound A in a subsequent second stage.
8. The use of an aqueous binder formulation according to any of embodiments 1 to 6 as binder in the production of adhesives, sealants, renders, paper coating slips, fiber nonwovens, flexible roof coatings, printing inks and coating compositions and in sand consolidation, as a component in the production of textile or leather auxiliaries and impact modifiers or to modify mineral binders and plastics.
9. The use of an aqueous binder formulation according to any of embodiments 1 to 6 as binder for granular and/or fibrous substrates.

The invention is described in more detail with reference to the non-limiting examples which follow.

Feedstocks Used:

Lupranol® 1000/1: polypropylene glycol (molar mass: 1970 g/mol; product of BASF SE)

Lupraphen® 7600/1: polyester polyol of aliphatic diol, adipic acid and aromatic dicarboxylic acid; molar mass: 2000 g/mol; product of BASF SE)

Lupraphen® 7800/1: polyester polyol of aliphatic diol, adipic acid and aromatic dicarboxylic acid; molar mass: 1000 g/mol; product of BASF SE)

Laromer® LR8765: butanediol diglycidether diacrylate (product of BASF SE)

Ebecryl® 3700: bisphenol A diglycidether diacrylate (product of Allnex SA)

MEHQ: 4-methoxyphenol

Kerobit® BHT: stabilizer, 2,6-di-tert-butyl-p-cresol (product of BASF SE)

TEMPOL: stabilizer, 4-hydroxy-2,2,6,6-tetramethylpiperidinyloxyl

Borchi® Kat 315: catalyst based on bismuth neodecanoate (product of Borchers GmbH)

IPDI: isophorone diisocyanate

Basonat® HI 100: trimeric isocyanurate of hexamethylene diisocyanate (product of BASF SE)

PUD salt: (2-aminoethyl)-3-aminopropanoic acid, sodium salt

Rheovis® PE 1330: thickener (ca. 30% by weight aqueous solution of a polyether; product of BASF SE)

Production of the Aqueous Polyurethane Dispersions

Dispersion 1 (D1)

245.5 g of Lupranol 1000/1, 15.9 g of hydroxyethyl acrylate, 14.2 g of Laromer LR 8765, 14.2 g of Ebecryl 3700, 23.4 g of 1,4-butanediol, 1.8 g of n-pentanol, 21.2 g of 2,2-(dimethylol) propionic acid, 37.4 g of methyl ethyl ketone, 0.5 g of Kerobit BHT, 0.05 g of TEMPOL and 0.33 g of Borchi Kat 315 were initially charged at 20 to 25° C. (room temperature) under nitrogen in a 2 l glass reactor and heated with stirring. On reaching an internal temperature of 53° C., 161.0 g of isophorone diisocyanate were added dropwise over 5 minutes, the feed line was rinsed with 17.3 g of methyl ethyl ketone and the reaction mixture was left to stir in an oil bath at an oil bath temperature of 100° C. 3 hours after reaching a maximum internal temperature of 114° C., a further 0.3 g of Borchi Kat 315 were added to the reaction mixture. The reaction mixture was then left to stir for a further 4 hours at the aforementioned oil bath temperature. After removing the oil bath and without further heating, the reaction mixture was diluted with 483.2 g of acetone while stirring. After taking a 0.5 g sample, the NCO content of the reaction mixture was determined to be 0.27% by weight. The reaction mixture obtained in this way was then transferred to a 4 l distillation apparatus and heated to an internal temperature of 52° C. Without further heating, 15.8 g of diethylethanolamine were added over 5 minutes and the mixture was stirred for a further 5 minutes. Then, 748.4 g of deionized water at 20 to 25° C. were added over 15 minutes with stirring. The acetone was then distilled off at a pressure of 100 mbar (absolute) with stirring until an internal temperature of 43° C. was reached. The reaction mixture obtained was finally cooled to room temperature.

The polyurethane dispersion obtained had a solids content of 39.7% by weight and a pH of 7.5. The mean particle size was determined to be 672 nm.

In the context of this document, NCO contents were determined by weighing a sample of the reaction mixture into a 250 ml glass beaker and dissolving it with ca. 150 ml of acetone while stirring. Using a dispenser, 10 ml of a 0.1 molar diethylbutyalmine solution in N-methyl-2-pyrrolidone (NMP) were metered in. This was then back-titrated at room temperature with 0.1 molar hydrochloric acid with stirring using an 848 Titrino plus device from Metrohm.

In the context of this document, the solids contents were generally determined by drying a defined amount of the aqueous polyurethane dispersion (ca. 0.8 g) to constant weight at a temperature of 130° C. using the Mettler Toledo HR73 moisture analyzer. Two measurements were in each case carried out and the average of these two measurements is reported.

The average particle sizes were generally determined according to ISO 13321 using a Malvern High Performance Particle Sizer at 22° C. and a wavelength of 633 nm.

The pH was generally determined by means of a calibrated InPro® 325X pH electrode from Mettler-Toledo GmbH.

Dispersion 2 (D2)

D2 was produced in exact analogy to the production of D1 with the difference that 265.9 g of Lupraphen 7600/1, 62.2 g of hydroxyethyl acrylate, 25.3 g of 2,2-(dimethylol) propionic acid, 39.3 g of methyl ethyl ketone, 0.5 g of Kerobit BHT, 0.05 g of TEMPOL and 0.65 g of Borchi Kat 315 were initially charged and heated. Starting at an internal temperature of 46° C., 137.6 g of isophorone diisocyanate were added dropwise over 5 minutes and the feed line was then rinsed with 14.8 g of methyl ethyl ketone. 3.5 hours after reaching a maximum internal temperature of 104° C., the reaction mixture (without further addition of catalyst and without further heating) was diluted with 476.7 g of acetone. An NCO content of 0.24% by weight was determined. After transferring the reaction mixture to the 4 l distillation apparatus, 22.0 g of diethylethanolamine and 755.1 g of deionized water were added to the reaction mixture.

The polyurethane dispersion obtained after distillation had a solids content of 40.5% by weight and a pH of 7.3. The mean particle size was determined to be 56 nm.

Dispersion 3 (D3)

D3 was produced in exact analogy to the production of D1 with the difference that 288.8 g of Lupraphen 7600/1, 65.7 g of Laromer LR 8765, 3.9 g of n-pentanol, 19.8 g of 2,2-(dimethylol) propionic acid, 40.0 g of methyl ethyl ketone, 0.5 g of Kerobit BHT, 0.05 g of TEMPOL and 0.65 g of Borchi Kat 315 were initially charged and heated. Starting at an internal temperature of 41° C., 117.6 g of isophorone diisocyanate were added dropwise over 5 minutes and the feed line was then rinsed with 12.5 g of methyl ethyl ketone. 4.5 hours after reaching a maximum internal temperature of 100° C., 481.4 g of acetone were added to the reaction mixture (without further addition of catalyst and without further heating). An NCO content of 0.31% by weight was determined. After transferring the reaction mixture to the 4 l distillation apparatus, 17.2 g of diethylethanolamine and 749.9 g of deionized water were added to the reaction mixture.

The polyurethane dispersion obtained after distillation had a solids content of 36.1% by weight and a pH of 7.9. The mean particle size was determined to be 41 nm.

Dispersion 4 (D4)

D4 was produced in exact analogy to the production of D1 with the difference that 192.0 g of Lupraphen 7600/1, 53.4 g of Ebecryl 3700, 42.8 g of 1,4-butanediol, 3.3 g of 1-pentanol, 16.2 g of (dimethylol) propionic acid, 34.2 g of methyl ethyl ketone, 0.5 g of Kerobit BHT, 0.05 g of TEMPOL and 0.7 g of Borchi Kat 315 were initially charged in the 2 l reactor and heated. Starting at an internal temperature of 61° C., 191.5 g of isophorone diisocyanate were added dropwise over 5 minutes and the feed line was then rinsed with 20.7 g of methyl ethyl ketone. 3 hours and 15 minutes after reaching a maximum internal temperature of 126° C., the reaction mixture (without further addition of catalyst and without further heating) was diluted with 484.5 g of acetone. An NCO content of 0.37% by weight was determined. After transferring the reaction mixture to the 4 l distillation apparatus, 13.9 g of diethylethanolamine and 746.4 g of deionized water were added to the reaction mixture.

The polyurethane dispersion obtained after distillation had a solids content of 39.8% by weight and a pH of 7.5. The mean particle size was determined to be 36 nm.

Dispersion 5 (D5)

D5 was produced in exact analogy to the production of D1 with the difference that 300.6 g of Lupraphen 7600/1, 4.2 g of hydroxyethyl acrylate, 63.0 g of Ebecryl 3700, 22.6 g of (dimethylol) propionic acid, 43.4 g of methyl ethyl ketone, 0.50 g of Kerobit BHT, 0.05 g of TEMPOL and 0.67 g of Borchi Kat 315 were initially charged in the 2 l reactor and heated. Starting at an internal temperature of 50° C., 109.0 g of isophorone diisocyanate were added dropwise over 5 minutes and the feed line was then rinsed with 11.6 g of methyl ethyl ketone. 3 hours after reaching a maximum temperature of 100° C., a further 0.3 g of Borchi Kat 315 were added to the reaction mixture. The reaction mixture was then left to stir for a further 2 hours and 20 minutes at the aforementioned oil bath temperature. After removing the oil bath and without further heating, the reaction mixture was diluted with 484.7 g of acetone while stirring. An NCO content of 0.18% by weight was determined. After transferring the reaction mixture to the 4 l distillation apparatus, 13.7 g of diethylethanolamine and 746.1 g of deionized water were added to the reaction mixture.

The polyurethane dispersion obtained after distillation was diluted with a further 200 g of deionized water and then had a solids content of 30.1% by weight and a pH of 7.3. The mean particle size was determined to be 41 nm.

Dispersion 6 (D6)

D6 was produced in exact analogy to the production of D1 with the difference that 255.0 g of Lupraphen 7600/1, 3.4 g of hydroxyethyl acrylate, 44.3 g of 1,4-butanediol, 18.6 g of (dimethylol) propionic acid, 35.7 g of methyl ethyl ketone, 0.50 g of Kerobit BHT, 0.05 g of TEMPOL and 0.67 g of Borchi Kat 315 were initially charged in the 2 l reactor and heated. Starting at an internal temperature of 55° C., 180.4 g of isophorone diisocyanate were added dropwise over 5 minutes and the feed line was then rinsed with 19.5 g of methyl ethyl ketone. 2 hours and 40 minutes after reaching a maximum internal temperature of 114° C., the reaction mixture (without further addition of catalyst and without further heating) was diluted with 487.1 g of acetone. An NCO content of 0.28% by weight was determined. After transferring the reaction mixture to the 4 l distillation apparatus, 11.3 g of diethylethanolamine and 743.5 g of deionized water were added to the reaction mixture.

The polyurethane dispersion obtained after distillation had a solids content of 37.9% by weight and a pH of 7.6. The mean particle size was determined to be 55 nm.

Dispersion 7 (D7)

D7 was produced in exact analogy to the production of D1 with the difference that 179.4 g of Lupraphen 7600/1, 3.2 g of hydroxyethyl acrylate, 48.7 g of Laromer LR 8765, 41.5 g of 1,4-butanediol, 21.0 g of (dimethylol) propionic acid, 32.6 g of methyl ethyl ketone, 0.49 g of Kerobit BHT, 0.05 g of TEMPOL and 0.66 g of Borchi Kat 315 were initially charged in the 2l reactor and heated. Starting at an internal temperature of 45° C., 201.0 g of isophorone diisocyanate were added dropwise over 5 minutes and the feed line was then rinsed with 21.8 g of methyl ethyl ketone. 3.5 hours after reaching a maximum internal temperature of 110° C., the reaction mixture (without further addition of catalyst and without further heating) was diluted with 480.3 g of acetone. An NCO content of 0.42% by weight was determined. After transferring the reaction mixture to the 4 l distillation apparatus, 18.3 g of diethylethanolamine and 751.0 g of deionized water were added to the reaction mixture.

The polyurethane dispersion obtained after distillation had a solids content of 40.4% by weight and a pH of 8.1. The mean particle size was determined to be 36 nm.

Dispersion 8 (D8)

D8 was produced in exact analogy to the production of D1 with the difference that 234.0 g of Lupranol 1000/1, 26.8 g of hydroxyethyl acrylate, 33.5 g of 1,4-butanediol, 21.5 g of (dimethylol) propionic acid, 35.1 g of methyl ethyl ketone, 0.49 g of Kerobit BHT, 0.05 g of TEMPOL and 0.66 g of Borchi Kat 315 were initially charged in the 2 l reactor and heated. Starting at an internal temperature of 60° C., 178.5 g of isophorone diisocyanate were added dropwise over 5 minutes and the feed line was then rinsed with 19.3 g of methyl ethyl ketone. 4 hours after reaching a maximum internal temperature of 110° C., the reaction mixture (without further addition of catalyst and without further heating) was diluted with 479.9 g of acetone. An NCO content of 0.29% by weight was determined. After transferring the reaction mixture to the 4 l distillation apparatus, 18.7 g of diethylethanolamine and 751.5 g of deionized water were added to the reaction mixture.

The polyurethane dispersion obtained after distillation had a solids content of 37.3% by weight and a pH of 7.9. The mean particle size was determined to be 424 nm.

Dispersion 9 (D9)

D9 was produced in exact analogy to the production of D1 with the difference that 245.3 g of Lupraphen 7600/1, 14.6 g of hydroxyethyl acrylate, 14.2 g of Laromer LR 8765, 14.2 g of Ebecryl 3700, 23.3 g of 1,4-butanediol, 23.4 g of (dimethylol) propionic acid, 37.2 g of methyl ethyl ketone, 0.50 g of Kerobit BHT, 0.05 g of TEMPOL and 0.66 g of Borchi Kat 315 were initially charged in the 2 l reactor and heated. Starting at an internal temperature of 49° C., 160.8 g of isophorone diisocyanate were added dropwise over 5 minutes and the feed line was then rinsed with 17.3 g of methyl ethyl ketone. 5 hours after reaching a maximum internal temperature of 110° C., the reaction mixture (without further addition of catalyst and without further heating) was diluted with 481.2 g of acetone. An NCO content of 0.29% by weight was determined. After transferring the reaction mixture to the 4 l distillation apparatus, 17.4 g of diethylethanolamine and 750.1 g of deionized water were added to the reaction mixture.

The polyurethane dispersion obtained after distillation had a solids content of 38.8% by weight and a pH of 7.6. The mean particle size was determined to be 66 nm.

Dispersion 10 (D10)

D10 was produced in exact analogy to the production of D1 with the difference that 382.6 g of Lupranol 1000/1, 4.3 g of hydroxyethyl acrylate, 21.4 g of (dimethylol) propionic acid, 45.4 g of methyl ethyl ketone, 0.49 g of Kerobit BHT, 0.05 g of TEMPOL and 0.66 g of Borchi Kat 315 were initially charged in the 2 l reactor and heated. Starting at an internal temperature of 46° C., 86.2 g of isophorone diisocyanate were added dropwise over 5 minutes and the feed line was then rinsed with 9.0 g of methyl ethyl ketone. 6 hours and 15 minutes after reaching a maximum internal temperature of 100° C., the reaction mixture (without further addition of catalyst and without further heating) was diluted with 480.1 g of acetone. An NCO content of 0.16% by weight was determined. After transferring the reaction mixture to the 4 l distillation apparatus, 18.5 g of diethylethanolamine and 851.3 g of deionized water were added to the reaction mixture.

A further 400 g of deionized water were added to the polyurethane dispersion obtained after distillation. Said dispersion had a solids content of 29.3% by weight and a pH of 8.0. The mean particle size was determined to be 26 nm.

Dispersion 11 (D11)

D11 was produced in exact analogy to the production of D1 with the difference that 188.3 g of Lupranol 1000/1, 52.1 g of Laromer LR 8765, 41.7 g of 1,4-butanediol, 3.0 g of 1-pentanol, 17.5 g of (dimethylol) priopionic acid, 33.6 g of methyl ethyl ketone, 0.50 g of Kerobit BHT, 0.05 g of TEMPOL and 0.67 g of Borchi Kat 315 were initially charged in the 2 l reactor and heated. Starting at an internal temperature of 40° C., 199.7 g of isophorone diisocyanate were added dropwise over 5 minutes and the feed line was then rinsed with 21.6 g of methyl ethyl ketone. 3.5 hours after reaching a maximum internal temperature of 115° C., the reaction mixture (without further addition of catalyst and without further heating) was diluted with 487.7 g of acetone. An NCO content of 0.57% by weight was determined. After transferring the reaction mixture to the 4 l distillation apparatus, 10.7 g of diethylethanolamine and 742.8 g of deionized water were added to the reaction mixture.

The polyurethane dispersion obtained after distillation had a solids content of 41.7% by weight and a pH of 7.7. The mean particle size was determined to be 684 nm.

Dispersion 12 (D12)

D12 was produced in exact analogy to the production of D1 with the difference that 180.7 g of Lupranol 1000/1, 3.0 g of hydroxyethyl acrylate, 49.1 g of Ebecryl 3700, 41.8 g of 1,4-butanediol, 24.6 g of (dimethylol) propionic acid, 33.2 g of methyl ethyl ketone, 0.50 g of Kerobit BHT, 0.05 g of TEMPOL and 0.66 g of Borchi Kat 315 were initially charged in the 21 reactor and heated. Starting at an internal temperature of 56° C., 198.9 g of isophorone diisocyanate were added dropwise over 8 minutes and the feed line was then rinsed with 21.6 g of methyl ethyl ketone. 6.5 hours after reaching a maximum internal temperature of 104° C., the reaction mixture (without further addition of catalyst and without further heating) was diluted with 483.5 g of acetone. An NCO content of 0.34% by weight was determined. After transferring the reaction mixture to the 4 l distillation apparatus, 15.0 g of diethylethanolamine and 747.5 g of deionized water were added to the reaction mixture.

The polyurethane dispersion obtained after distillation had a solids content of 38.8% by weight and a pH of 7.4. The mean particle size was determined to be 199 nm.

Dispersion 13 (D13)

D13 was produced in exact analogy to the production of D1 with the difference that 277.2 g of Lupranol 1000/1, 65.9 g of Ebecryl 3700, 3.9 g of 1-pentanol, 26.8 g of (dimethylol) propionic acid, 41.5 g of methyl ethyl ketone, 0.49 g of Kerobit BHT, 0.05 g of TEMPOL and 0.65 g of Borchi Kat 315 were initially charged in the 2 l reactor and heated. Starting at an internal temperature of 47° C., 116.0 g of isophorone diisocyanate were added dropwise over 5 minutes and the feed line was then rinsed with 12.3 g of methyl ethyl ketone. 6 hours after reaching a maximum internal temperature of 85° C., the reaction mixture (without further addition of catalyst and without further heating) was diluted with 475.5 g of acetone. An NCO content of 0.22% by weight was determined. After transferring the reaction mixture to the 4 l distillation apparatus, 23.2 g of diethylethanolamine and 756.5 g of deionized water were added to the reaction mixture. In addition, during the distillation, a further 700 g of deionized water were added.

The polyurethane dispersion obtained after distillation had a solids content of 25.7% by weight and a pH of 8.0. The mean particle size was determined to be 31 nm.

Dispersion 14 (D14)

D14 was produced in exact analogy to the production of D1 with the difference that 276.0 g of Lupraphen 7600/1, 32.7 g of hydroxyethyl acrylate, 12.4 g of 1,4-butanediol, 26.3 g of (dimethylol) propionic acid, 38.6 g of methyl ethyl ketone, 0.49 g of Kerobit BHT, 0.05 g of TEMPOL and 0.65 g of Borchi Kat 315 were initially charged in the 2 l reactor and heated. Starting at an internal temperature of 52° C., 142.8 g of isophorone diisocyanate were added dropwise over 5 minutes and the feed line was then rinsed with 15.3 g of methyl ethyl ketone. 3 hours and 15 minutes after reaching a maximum internal temperature of 105° C., the reaction mixture (without further addition of catalyst and without further heating) was diluted with 475.9 g of acetone. An NCO content of 0.20% by weight was determined. After transferring the reaction mixture to the 4 l distillation apparatus, 22.8 g of diethylethanolamine and 756.0 g of deionized water were added to the reaction mixture.

The polyurethane dispersion obtained after distillation had a solids content of 42.0% by weight and a pH of 7.6. The mean particle size was determined to be 31 nm.

Dispersion 15 (D15)

D15 was produced in exact analogy to the production of D1 with the difference that 213.9 g of Lupraphen 7600/1, 28.4 g of 1,4-butanediol, 18.3 g of (dimethylol) propionic acid, 47.2 g of Laromer 8765, 34.2 g of methyl ethyl ketone, 0.49 g of Kerobit BHT and 0.05 g of TEMPOL were initially charged in the 2 l reactor and heated. Starting at an internal temperature of 48° C., 185.1 g of isophorone diisocyanate were added dropwise over 5 minutes and the feed line was then rinsed with 20.0 g of methyl ethyl ketone. 3 hours after reaching a maximum internal temperature of 95° C., the reaction mixture (without further addition of catalyst and without further heating) was diluted with 471.3 g of acetone. An NCO content of 1.10% by weight was determined. After transferring the reaction mixture to the 4 l distillation apparatus, 2.1 g of isophoronediamine, 16.0 g of diethylethanolamine, 724.9 g of deionized water and a solution of 5.7 g of diethylenetriamine and 32.4 g of deionized water were added in succession to the reaction mixture.

The polyurethane dispersion obtained after distillation had a solids content of 40.8% by weight and a pH of 8.0. The mean particle size was determined to be 61 nm.

Dispersion 16 (D16)

D16 was produced in exact analogy to the production of D1 with the difference that 204.1 g of Lupraphen 7600/1, 25.5 g of 1,4-butanediol, 18.1 g of (dimethylol) propionic acid, 69.3 g of Ebecryl 3700, 35.2 g of methyl ethyl ketone, 0.49 g of Kerobit BHT and 0.05 g of TEMPOL were initially charged in the 2 l reactor and heated. Starting at an internal temperature of 50° C., 176.6 g of isophorone diisocyanate were added dropwise over 5 minutes and the feed line was then rinsed with 19.1 g of methyl ethyl ketone. 3 hours after reaching a maximum internal temperature of 101° C., the reaction mixture (without further addition of catalyst and without further heating) was diluted with 472.0 g of acetone. An NCO content of 1.17% by weight was determined. After transferring the reaction mixture to the 4 l distillation apparatus, 2.0 g of isophoronediamine, 15.9 g of diethylethanolamine, 725.3 g of deionized water and a solution of 5.5 g of diethylenetriamine and 31.0 g of deionized water were added to the reaction mixture.

The polyurethane dispersion obtained after distillation had a solids content of 40.9% by weight and a pH of 7.7. The mean particle size was determined to be 61 nm.

Dispersion 17 (D17)

D17 was produced in exact analogy to the production of D1 with the difference that 277.1 g of Lupraphen 7600/1, 32.8 g of hydroxyethyl acrylate, 16.3 g of 1,4-butanediol, 20.6 g of (dimethylol) propionic acid, 38.5 g of methyl ethyl ketone, 0.49 g of Kerobit BHT, 0.05 g of TEMPOL and 0.65 g of Borchi Kat 315 were initially charged in the 2 l reactor and heated. Starting at an internal temperature of 49° C., 143.4 g of isophorone diisocyanate were added dropwise over 5 minutes and the feed line was then rinsed with 15.4 g of methyl ethyl ketone. 3 hours after reaching a maximum internal temperature of 102° C., the reaction mixture (without further addition of catalyst and without further heating) was diluted with 475.8 g of acetone. An NCO content of 0.23% by weight was determined. After transferring the reaction mixture to the 4 l distillation apparatus, 18.0 g of diethylethanolamine and
756.1 g of deionized water were added to the reaction mixture.

The polyurethane dispersion obtained after distillation had a solids content of 39.9% by weight and a pH of 7.4. The mean particle size was determined to be 36 nm.

Dispersion 18 (D18)

D18 was produced in exact analogy to the production of D1 with the difference that 250.8 g of Lupraphen 7600/1, 14.9 g of hydroxyethyl acrylate, 14.5 g of Laromer LR 8765, 14.5 g of Ebecryl 3700, 23.9 g of 1,4-butanediol, 23.9 g of (dimethylol) propionic acid, 38.1 g of methyl ethyl ketone, 0.51 g of Kerobit BHT, 0.05 g of TEMPOL and 0.68 g of Borchi Kat 315 were initially charged in the 2 l reactor and heated. Starting at an internal temperature of 49° C., 164.5 g of isophorone diisocyanate were added dropwise over 5 minutes and the feed line was then rinsed with 17.7 g of methyl ethyl ketone. 4 hours and 45 minutes after reaching a maximum internal temperature of 105° C., the reaction mixture (without further addition of catalyst and without further heating) was diluted with 492.2 g of acetone. An NCO content of 0.25% by weight was determined. After transferring the reaction mixture to the 4 l distillation apparatus, 60.6 g of a 10% by weight aqueous sodium hydroxide solution and 683.3 g of deionized water were added to the reaction mixture. In addition, during the distillation, a further 300 g of deionized water were added.

The polyurethane dispersion obtained after distillation had a solids content of 32.6% by weight and a pH of 7.7. The mean particle size was determined to be 31 nm.

Dispersion 19 (D19)

D19 was produced in exact analogy to the production of D1 with the difference that 283.5 g of Lupraphen 7600/1, 33.6 g of hydroxyethyl acrylate, 20.5 g of 1,4-butanediol, 15.4 g of (dimethylol) propionic acid, 39.2 g of methyl ethyl ketone, 0.50 g of Kerobit BHT, 0.05 g of TEMPOL and 0.67 g of Borchi Kat 315 were initially charged in the 2 l reactor and heated. Starting at an internal temperature of 52° C., 146.7 g of isophorone diisocyanate were added dropwise over 5 minutes and the feed line was then rinsed with 15.8 g of methyl ethyl ketone. 2.5 hours after reaching a maximum internal temperature of 100° C., the reaction mixture (without further addition of catalyst and without further heating) was diluted with 485.1 g of acetone. An NCO content of 0.23% by weight was determined. After transferring the reaction mixture to the 4 l distillation apparatus, 13.4 g of diethylethanolamine and 745.7 g of deionized water were added to the reaction mixture.

The polyurethane dispersion obtained after distillation had a solids content of 42.4% by weight and a pH of 7.7. The mean particle size was determined to be 449 nm.

Dispersion 20 (D20)

D20 was produced in exact analogy to the production of D1 with the difference that 251.9 g of Lupraphen 7600/1, 15.0 g of hydroxyethyl acrylate, 14.6 g of Laromer LR 8765, 14.6 g of Ebecryl 3700, 26.4 g of 1,4-butanediol, 20.4 g of (dimethylol) propionic acid, 38.1 g of methyl ethyl ketone, 0.51 g of Kerobit BHT, 0.05 g of TEMPOL and 0.68 g of Borchi Kat 315 were initially charged in the 2 l reactor and heated. Starting at an internal temperature of 55° C., 165.1 g of isophorone diisocyanate were added dropwise over 5 minutes and the feed line was then rinsed with 17.8 g of methyl ethyl ketone. 4 hours and 10 minutes after reaching a maximum internal temperature of 111° C., the reaction mixture (without further addition of catalyst and without further heating) was diluted with 493.0 g of acetone. An NCO content of 0.25% by weight was determined. After transferring the reaction mixture to the 4-l distillation apparatus, 51.7 g of a 10% by weight aqueous sodium hydroxide solution and 690.3 g of deionized water were added to the reaction mixture. In addition, during the distillation, a further 350 g of deionized water were added.

The polyurethane dispersion obtained after distillation had a solids content of 32.6% by weight and a pH of 7.9. The mean particle size was determined to be 35 nm.

Dispersion 21 (D21)

D21 was produced in exact analogy to the production of D1 with the difference that 281.7 g of Lupraphen 7600/1, 33.4 g of hydroxyethyl acrylate, 18.6 g of 1,4-butanediol, 18.0 g of (dimethylol) propionic acid, 39.1 g of methyl ethyl ketone, 0.50 g of Kerobit BHT, 0.05 g of TEMPOL and 0.66 g of Borchi Kat 315 were initially charged in the 2 l reactor and heated. Starting at an internal temperature of 50° C., 145.8 g of isophorone diisocyanate were added dropwise over 5 minutes and the feed line was then rinsed with 15.7 g of methyl ethyl ketone. 2 hours after reaching a maximum internal temperature of 100° C., the reaction mixture (without further addition of catalyst and without further heating) was diluted with 482.9 g of acetone. An NCO content of 0.23% by weight was determined. After transferring the reaction mixture to the 4 l distillation apparatus, 15.6 g of diethylethanolamine and 748.1 g of deionized water were added to the reaction mixture.

The polyurethane dispersion obtained after distillation had a solids content of 42.5% by weight and a pH of 7.5. The mean particle size was determined to be 309 nm.

Dispersion 22 (D22)

D22 was produced in exact analogy to the production of D1 with the difference that 252.6 g of Lupraphen 7600/1, 15.0 g of hydroxyethyl acrylate, 14.6 g of Laromer LR 8765, 14.6 g of Ebecryl 3700, 28.1 g of butanediol, 18.0 g of (dimethylol) propionic acid, 38.1 g of methyl ethyl ketone, 0.51 g of Kerobit BHT, 0.05 g of TEMPOL and 0.68 g of Borchi Kat 315 were initially charged in the 2 l reactor and heated. Starting at an internal temperature of 65° C., 165.6 g of isophorone diisocyanate were added dropwise over 5 minutes and the feed line was then rinsed with 17.8 g of methyl ethyl ketone. 4 hours after reaching a maximum internal temperature of 114° C., the reaction mixture (without further addition of catalyst and without further heating) was diluted with 493.6 g of acetone. An NCO content of 0.27% by weight was determined. After transferring the reaction mixture to the 4 l distillation apparatus, 45.6 g of a 10% by weight aqueous sodium hydroxide solution and 695.2 g of deionized water were added to the reaction mixture. In addition, during the distillation, a further 250 g of deionized water were added.

The polyurethane dispersion obtained after distillation had a solids content of 34.3% by weight and a pH of 8.1. The mean particle size was determined to be 39 nm.

Dispersion 23 (D23)

D23 was produced in exact analogy to the production of D1 with the difference that 173.2 g of Lupraphen 7600/1, 23.0 g of (dimethylol) propionic acid, 147.4 g of Ebecryl 3700, 38.2 g of methyl ethyl ketone, 0.49 g of Kerobit BHT and 0.05 g of TEMPOL were initially charged in the 2 l reactor and heated. Starting at an internal temperature of 50° C., 149.7 g of isophorone diisocyanate were added dropwise over 5 minutes and the feed line was then rinsed with 16.1 g of methyl ethyl ketone. 4 hours after reaching a maximum internal temperature of 100° C., the reaction mixture (without further addition of catalyst and without further heating) was diluted with 471.7 g of acetone. An NCO content of 1.00% by weight was determined. After transferring the reaction mixture to the 4 l distillation apparatus, 1.7 g of isophoronediamine, 18.0 g of diethylethanolamine, 729.5 g of deionized water and a solution of 4.6 g of diethylenetriamine and 26.3 g of deionized water were added to the reaction mixture. In addition, during the distillation, a further 100 g of deionized water were added.

The polyurethane dispersion obtained after distillation had a solids content of 36.3% by weight and a pH of 7.7. The mean particle size was determined to be 55 nm.

Dispersion 24 (D24)

D24 was produced in exact analogy to the production of D1 with the difference that 379.1 g of Lupraphen 7600/1, 22.5 g of hydroxyethyl acrylate, 21.9 g of Laromer LR 8765, 21.9 g of Ebecryl 3700, 33.2 g of 1,4-butanediol, 40.4 g of (dimethylol) propionic acid, 57.7 g of methyl ethyl ketone, 0.77 g of Kerobit BHT, 0.08 g of TEMPOL and 1.02 g of Borchi Kat 315 were initially charged in the 2 l reactor and heated. Starting at an internal temperature of 50° C., 248.5 g of isophorone diisocyanate were added dropwise over 5 minutes and the feed line was then rinsed with 26.8 g of methyl ethyl ketone. 3 hours after reaching a maximum internal temperature of 107° C., the reaction mixture (without further addition of catalyst and without further heating) was diluted with 745.2 g of acetone. An NCO content of 0.26% by weight was determined (the product obtained is also referred to below as a prepolymer). After transferring a portion of 800 g of the reaction mixture to the 4 l distillation apparatus, 15.4 g of triethylamine and 589.3 g of deionized water were added to the reaction mixture. In addition, a further 100 g of deionized water were added during the distillation and a further 200 g of deionized water after the distillation.

The polyurethane dispersion obtained in this case had a solids content of 30.2% by weight and a pH of 7.3. The mean particle size was determined to be 38 nm.

Dispersion 25 (D25)

730 g of the prepolymer from Experiment 24 were weighed into the 4 l distillation apparatus and heated to 53° C. 55.4 g of a 10% by weight aqueous sodium hydroxide solution and 487.8 g of deionized water were added to the reaction mixture, and the mixture was then distilled. In addition, during the distillation, a further 200 g of deionized water were added.

The polyurethane dispersion obtained after distillation had a solids content of 35.1% by weight and a pH of 7.5. The mean particle size was determined to be 38 nm.

Dispersion 26 (D26)

D26 was produced in exact analogy to the production of D1 with the difference that 179.8 g of Lupraphen 7600/1, 5.0 g of hydroxyethyl acrylate, 46.1 g of Laromer LR 8765, 41.5 g of 1,4-butanediol, 21.0 g of (dimethylol) propionic acid, 32.6 g of methyl ethyl ketone, 0.49 g of Kerobit BHT, 0.05 g of TEMPOL and 0.66 g of Borchi Kat 315 were initially charged in the 2 l reactor and heated. Starting at an internal temperature of 57° C., 201.3 g of isophorone diisocyanate were added dropwise over 5 minutes and the feed line was then rinsed with 21.8 g of methyl ethyl ketone. 4 hours after reaching a maximum internal temperature of 117° C., the reaction mixture (without further addition of catalyst and without further heating) was diluted with 480.3 g of acetone. An NCO content of 0.36% by weight was determined. After transferring the reaction mixture to the 4 l distillation apparatus, 18.3 g of diethylethanolamine and 751.1 g of deionized water were added to the reaction mixture. In addition, after the distillation, a further 250 g of deionized water were added.

The polyurethane dispersion obtained in this case had a solids content of 29.1% by weight and a pH of 7.6. The mean particle size was determined to be 35 nm.

Dispersion 27 (D27)

D27 was produced in exact analogy to the production of D1 with the difference that 246.6 g of Lupraphen 7600/1, 14.6 g of hydroxyethyl acrylate, 14.3 g of Laromer LR 8765, 14.2 g of Ebecryl 3700, 21.6 g of 1,4-butanediol, 26.6 g of (dimethylol) propionic acid, 37.5 g of methyl ethyl ketone, 0.50 g of Kerobit BHT, 0.05 g of TEMPOL and 0.67 g of Borchi Kat 315 were initially charged in the 2 l reactor and heated. Starting at an internal temperature of 50° C., 161.7 g of isophorone diisocyanate were added dropwise over 5 minutes and the feed line was then rinsed with 17.4 g of methyl ethyl ketone. 3 hours after reaching a maximum internal temperature of 106° C., the reaction mixture (without further addition of catalyst and without further heating) was diluted with 484.7 g of acetone. An NCO content of 0.28% by weight was determined. After transferring the reaction mixture to the 4 l distillation apparatus, 13.8 g of diethylethanolamine and 746.2 g of deionized water were added to the reaction mixture.

The polyurethane dispersion obtained after distillation had a solids content of 43.4% by weight and a pH of 6.9. The mean particle size was determined to be 344 nm.

Dispersion 28 (D28)

D28 was produced in exact analogy to the production of D1 with the difference that 253.8 g of Lupraphen 7600/1, 15.1 g of hydroxyethyl acrylate, 14.7 g of Laromer LR 8765, 14.7 g of Ebecryl 3700, 31.7 g of 1,4-butanediol, 12.9 g of (dimethylol) propionic acid, 38.1 g of methyl ethyl ketone, 0.51 g of Kerobit BHT, 0.05 g of TEMPOL and 0.68 g of Borchi Kat 315 were initially charged in the 2 l reactor and heated. Starting at an internal temperature of 63° C., 166.4 g of isophorone diisocyanate were added dropwise over 5 minutes and the feed line was then rinsed with 17.9 g of methyl ethyl ketone. 4 hours and 10 minutes after reaching a maximum internal temperature of 112° C., the reaction mixture (without further addition of catalyst and without further heating) was diluted with 494.3 g of acetone. An NCO content of 0.25% by weight was determined. After transferring the reaction mixture to the 4 l distillation apparatus, 38.5 g of a 10% by weight aqueous sodium hydroxide solution and 700.8 g of deionized water were added to the reaction mixture. In addition, during the distillation, a further 50 g of deionized water were added.

The polyurethane dispersion obtained after distillation had a solids content of 39.3% by weight and a pH of 8.0. The mean particle size was determined to be 87 nm.

Dispersion 29 (D29)

D29 was produced in exact analogy to the production of D1 with the difference that 254.3 g of Lupraphen 7600/1, 15.1 g of hydroxyethyl acrylate, 14.7 g of Laromer LR 8765, 14.7 g of Ebecryl 3700, 32.9 g of 1,4-butanediol, 11.3 g of (dimethylol) propionic acid, 38.1 g of methyl ethyl ketone, 0.51 g of Kerobit BHT, 0.05 g of TEMPOL and 0.68 g of Borchi Kat 315 were initially charged in the 2 l reactor and heated. Starting at an internal temperature of 52° C., 166.7 g of isophorone diisocyanate were added dropwise over 5 minutes and the feed line was then rinsed with 18.0 g of methyl ethyl ketone. 3.5 hours after reaching a maximum internal temperature of 109° C., the reaction mixture (without further addition of catalyst and without further heating) was diluted with 494.8 g of acetone. An NCO content of 0.26% by weight was determined. After transferring the reaction mixture to the 4 l distillation apparatus, 33.7 g of a 10% by weight aqueous sodium hydroxide solution and 704.6 g of deionized water were added to the reaction mixture.

The polyurethane dispersion obtained after distillation had a solids content of 42.8% by weight and a pH of 8.0. The mean particle size was determined to be 175 nm.

Dispersion 30 (D30)

D30 was produced in exact analogy to the production of D1 with the difference that 214.8 g of Lupraphen 7600/1, 30.5 g of 1,4-butanediol, 15.7 g of (dimethylol) propionic acid, 47.6 g of Laromer 8765, 34.3 g of methyl ethyl ketone, 0.50 g of Kerobit BHT and 0.05 g of TEMPOL were initially charged in the 2 l reactor and heated. Starting at an internal temperature of 50° C., 186.4 g of isophorone diisocyanate were added dropwise over 5 minutes and the feed line was then rinsed with 20.2 g of methyl ethyl ketone. 3 hours after reaching a maximum internal temperature of 112° C., the reaction mixture (without further addition of catalyst and without further heating) was diluted with 473.4 g of acetone. An NCO content of 1.20% by weight was determined. After transferring the reaction mixture to the 4 l distillation apparatus, 2.15 g of isophoronediamine, 13.7 g of diethylethanolamine, 722.4 g of deionized water and a solution of 5.8 g of diethylenetriamine and 32.6 g of deionized water were added to the reaction mixture.

The polyurethane dispersion obtained after distillation had a solids content of 41.2% by weight and a pH of 7.7. The mean particle size was determined to be 115 nm.

Dispersion 31 (D31)

D31 was produced in exact analogy to the production of D1 with the difference that 236.1 g of Lupraphen 7600/1, 31.5 g of 1,4-butanediol, 18.0 g of (dimethylol) propionic acid, 80.3 g of Ebecryl 3700, 40.6 g of methyl ethyl ketone, 0.57 g of Kerobit BHT and 0.06 g of TEMPOL were initially charged in the 2 l reactor and heated. Starting at an internal temperature of 52° C., 204.8 g of isophorone diisocyanate were added dropwise over 5 minutes and the feed line was then rinsed with 22.1 g of methyl ethyl ketone. 4 hours and 40 minutes after reaching an increasing internal temperature of 90° C. (up to 95° C.), the reaction mixture (without further addition of catalyst and without further heating) was diluted with 545.8 g of acetone. An NCO content of 1.17% by weight was determined. After transferring the reaction mixture to the 4 l distillation apparatus, 2.4 g of isophoronediamine, 15.8 g of diethylethanolamine, 559.8 g of deionized water and a solution of 6.3 g of diethylenetriamine and 35.8 g of deionized water were added to the reaction mixture.

The polyurethane dispersion obtained after distillation had a solids content of 51.2% by weight and a pH of 7.5. The mean particle size was determined to be 350 nm.

Dispersion 32 (D32)

D32 was produced in exact analogy to the production of D1 with the difference that 187.9 g of Lupraphen 7600/1, 23.4 g of (dimethylol) propionic acid, 118.1 g of Laromer LR 8765, 36.6 g of methyl ethyl ketone, 0.49 g of Kerobit BHT and 0.05 g of TEMPOL were initially charged in the 2 l reactor and heated. Starting at an internal temperature of 45° C., 162.6 g of isophorone diisocyanate were added dropwise over 5 minutes and the feed line was then rinsed with 17.5 g of methyl ethyl ketone. 2 hours and 10 minutes after reaching a maximum internal temperature of 102° C., the reaction mixture (without further addition of catalyst and without further heating) was diluted with 470.5 g of acetone. An NCO content of 1.06% by weight was determined. After transferring the reaction mixture to the 4 l distillation apparatus, 1.8 g of isophoronediamine, 18.5 g of diethylethanolamine, 729.1 g of deionized water and a solution of 5.0 g of diethylenetriamine and 28.5 g of deionized water were added to the reaction mixture. In addition, during the distillation, a further 300 g of deionized water were added.

The polyurethane dispersion obtained after distillation had a solids content of 31.5% by weight and a pH of 7.7. The mean particle size was determined to be 72 nm.

Dispersion 33 (D33)

D33 was produced in exact analogy to the production of D1 with the difference that 91.5 g of Lupraphen 7800/1, 119.1 g of hydroxyethyl methacrylate, 44.1 g of 1,4-butanediol, 200.1 g of acetone, 0.80 g of Kerobit BHT, 0.05 g of TEMPOL, 0.47 g of 4-methoxyphenol and 0.57 g of Borchi Kat 315 were initially charged in the 2 l reactor and heated. Starting at an internal temperature of 48° C., 215.8 g of isophorone diisocyanate and 64.8 g of Basonat HI 100 were added dropwise over 15 minutes. 2 hours after reaching a maximum internal temperature of 70° C., an NCO content of 1.28% by weight was determined. After transferring the reaction mixture to the 4 l distillation apparatus and rinsing with 49.9 g of acetone, 43.1 g of a 40% by weight aqueous PUD salt solution was added to the reaction mixture at a temperature of 48° C. and dispersed with 669.8 g of deionized water.

The polyurethane dispersion obtained after distillation had a solids content of 43.8% by weight and a pH of 8.0. The mean particle size was determined to be 82 nm.

Dispersion 34 (D34)

D34 was produced in exact analogy to the production of D1 with the difference that 244.4 g of Lupraphen 7600/1, 16.3 g of hydroxyethyl methacrylate, 14.1 g of Laromer LR 8765, 14.1 g of Ebecryl 3700, 23.3 g of 1,4-butanediol, 23.3 g of (dimethylol) propionic acid, 37.3 g of methyl ethyl ketone, 0.50 g of Kerobit BHT, 0.05 g of TEMPOL and 0.66 g of Borchi Kat 315 were initially charged in the 2 l reactor and heated. Starting at an internal temperature of 52° C., 160.2 g of isophorone diisocyanate were added dropwise over 5 minutes, and the feed line was then rinsed with 17.3 g of methyl ethyl ketone. 5 hours after reaching a maximum internal temperature of 100° C., the reaction mixture (without further addition of catalyst and without further heating) was diluted with 481.5 g of acetone. An NCO content of 0.28% by weight was determined. After transferring the reaction mixture to the 4 l distillation apparatus, 17.3 g of diethylethanolamine and 750.0 g of deionized water were added to the reaction mixture. In addition, after the distillation, a further 100.0 g of deionized water were added.

The polyurethane dispersion obtained in this case had a solids content of 39.0% by weight and a pH of 7.5. The mean particle size was determined to be 84 nm.

Dispersion 35 (D35)

D35 was produced in exact analogy to the production of D1 with the difference that 202.4 g of Lupraphen 7600/1, 23.9 g of (dimethylol) propionic acid, 18.0 g of hydroxyethyl acrylate, 38.7 g of methyl ethyl ketone, 0.50 g of Kerobit BHT and 0.05 g of TEMPOL were initially charged in the 2 l reactor and heated. Starting at an internal temperature of 43° C., 154.9 g of isophorone diisocyanate were added dropwise over 5 minutes and the feed line was then rinsed with 16.7 g of methyl ethyl ketone. 1 hour and 25 minutes after feeding in the isophorone diisocyanate, 104.1 g of Laromer LR 8765 were added. 8.5 hours after reaching an increasing temperature of 86° C., the reaction mixture (without further addition of catalyst and without further heating) was diluted with 481.2 g of acetone. An NCO content of 0.39% by weight was determined. After transferring the reaction mixture to the 4 l distillation apparatus, 18.8 g of diethylethanolamine and 740.9 g of deionized water were added to the reaction mixture. In addition, during the distillation, a further 250 g of deionized water were added.

The polyurethane dispersion obtained after distillation had a solids content of 32.9% by weight and a pH of 7.2. The mean particle size was determined to be 36 nm.

Dispersion 36 (D36)

D36 was produced in exact analogy to the production of D1 with the difference that 279.4 g of Lupraphen 7600/1, 22.3 g of (dimethylol) propionic acid, 72.8 g of Ebecryl 3700, 41.6 g of methyl ethyl ketone, 0.50 g of Kerobit BHT and 0.05 g of TEMPOL were initially charged in the 2 l reactor and heated. Starting at an internal temperature of 60° C., 121.5 g of isophorone diisocyanate were added dropwise over 5 minutes and the feed line was then rinsed with 13.0 g of methyl ethyl ketone. 3 hours and 15 minutes after reaching a maximum internal temperature of 102° C., the reaction mixture (without further addition of catalyst and without further heating) was diluted with 474.2 g of acetone. An NCO content of 0.85% by weight was determined. After transferring the reaction mixture to the 4 l distillation apparatus, 1.4 g of isophoronediamine, 17.5 g of diethylethanolamine, 731.0 g of deionized water and a solution of 3.8 g of diethylenetriamine and 21.3 g of deionized water were added to the reaction mixture. In addition, during the distillation, a further 50 g of deionized water were added.

The polyurethane dispersion obtained after distillation had a solids content of 38.0% by weight and a pH of 8.0. The mean particle size was determined to be 31 nm.

Dispersion 37 (D37)

D37 was produced in exact analogy to the production of D1 with the difference that 273.9 g of Lupraphen 7600/1, 36.4 g of hydroxyethyl methacrylate, 12.3 g of 1,4-butanediol, 26.1 g of (dimethylol) propionic acid, 38.7 g of methyl ethyl ketone, 0.49 g of Kerobit BHT, 0.05 g of TEMPOL and 0.65 g of Borchi Kat 315 were initially charged in the 2 l reactor and heated. Starting at an internal temperature of 52° C., 141.8 g of isophorone diisocyanate were added dropwise over 5 minutes and the feed line was then rinsed with 15.2 g of methyl ethyl ketone. 2.5 hours after reaching a maximum internal temperature of 105° C., the reaction mixture (without further addition of catalyst and without further heating) was diluted with 476.1 g of acetone. An NCO content of 0.25% by weight was determined. After transferring the reaction mixture to the 4 l distillation apparatus, 22.6 g of diethylethanolamine and 755.8 g of deionized water were added to the reaction mixture.

The polyurethane dispersion obtained after distillation had a solids content of 46.2% by weight and a pH of 7.6. The mean particle size was determined to be 45 nm.

COMPARATIVE EXAMPLE 1 (C1)

C1 was produced in exact analogy to the production of D1 with the difference that 114.6 g of Lupraphen 7800/1, 68.9 g of 1-propanol, 55.3 g of 1,4-butanediol, 187.6 g of acetone, 0.89 g of Kerobit BHT, 0.06 g of TEMPOL, 0.51 g of MEHQ and 0.39 g of Borchi Kat 315 were initially charged in the 2 l reactor and heated. Starting at an internal temperature of 49° C., 270.4 g of isophorone diisocyanate and 81.1 g of Basonat HI 100 were added dropwise over 15 minutes. 1 hour and 35 minutes after feeding the isophorone diisocyanate and the basonate HI 100, a further 0.2 g of Borchi Kat 315 were added. After a total reaction time of 4 hours and 24 minutes at a constant internal temperature of 68 to 73° C., an NCO content of 1.54% by weight was determined. After transferring the reaction mixture to the 4 l distillation apparatus and rinsing with 88.4 g of acetone, 54.1 g of a 40% by weight aqueous PUD salt solution was added to the reaction mixture at 49° C. and dispersed with another 877.5 g of deionized water. In addition, during the distillation, a further 400 g of deionized water were added.

The polyurethane dispersion obtained after distillation had a solids content of 34.0% by weight and a pH of 9.5. The mean particle size was determined to be 126 nm.

Performance Testing

Determining Film Hardness

To a test portion of the polyurethane dispersions D1 to D37 and C1 with stirring at room temperature were added in each case 2.5% by weight of adipic acid dihydrazide (ADDH), based in each case on the polyurethane solids content of the corresponding polyurethane dispersion. Another test portion of the polyurethane dispersions D1 to D37 and C1 were used without addition of ADDH. If in this case the polyurethane dispersions with additives or the polyurethane dispersions without additives had a flow time of less than 20 seconds, measured using Erichsen DIN beaker 4 according to DIN 53211, then enough Rheovis PE 1330 was added until it had a viscosity in the range of ≥20 and ≤60 seconds (typical application level).

The resulting aqueous polyurethane dispersions D1 to D37 and C1 with or without additives were mixed homogeneously for 5 minutes at 3500 rpm using a Speedmixer DAC 150.1 FVZ immediately after their preparation or before their application. The resulting aqueous polyurethane dispersions with or without additives were then applied at room temperature with a 300 μm box-type coating bar to a grease-free 10×8 cm glass plate. The resulting wet films were—as specified in Table 1 below—either dried at room temperature and 60% relative humidity in a climatically controlled room in the dark and stored for the time also specified in Table 1 or dried and filmed at the specified temperature for 30 minutes and then stored in the climatically controlled room in the dark at room temperature and 60% relative humidity for the time period also specified in the table. In this case, the film layer thicknesses obtained after drying and storage were in the range of 40 to 100 μm.

The König pendulum damping of the polymer films obtained after drying and storage was determined in accordance with DIN EN ISO 1522. In this case, the higher the number of seconds also specified in Table 1, the harder the resulting polymer films are assessed to be.

TABLE 1

Results of the König pendulum damping measurement

| | | Pendulum damping [s] | | | |
|---|---|---|---|---|---|
| | | without ADDH | | with ADDH | |
| Dispersion | Filming temperature | 3 days | 6 weeks | 3 days | 6 weeks |
| D1 | room temperature | 11 | 5 | 11 | 20 |
| D2 | room temperature | 2 | 4 | 3 | 10 |
| D3 | room temperature | 11 | 10 | 13 | 25 |
| D4 | 40° C. | 104 | 97 | 104 | 113 |
| D5 | 60° C. | 17 | 17 | 20 | 43 |
| D6 | 60° C. | 66 | 64 | 63 | 77 |
| D7 | 40° C. | 83 | 90 | 67 | 104 |
| D8 | room temperature | 8 | 11 | 7 | 17 |
| D9 | room temperature | 39 | 46 | 36 | 83 |
| D10 | room temperature | 2 | 2 | 2 | 4 |
| D11 | 60° C. | 50 | 57 | 49 | 67 |
| D12 | room temperature | 66 | 63 | 57 | 95 |
| D13 | room temperature | 3 | 8 | 3 | 11 |
| D14 | room temperature | 8 | 8 | 7 | 22 |
| D15 | room temperature | 77 | 84 | 46 | 91 |
| D16 | 60° C. | 87 | 92 | 74 | 98 |
| D17 | room temperature | 4 | 8 | 6 | 22 |
| D18 | 60° C. | 31 | 38 | 25 | 69 |
| D19 | room temperature | 4 | 7 | 7 | 18 |
| D20 | 60° C. | 32 | 28 | 29 | 53 |
| D21 | 40° C. | 3 | 5 | 4 | 17 |
| D22 | 60° C. | 24 | 21 | 18 | 43 |
| D23 | 80° C. | 126 | 136 | 122 | 143 |
| D24 | 60° C. | 32 | 38 | 34 | 80 |
| D25 | 60° C. | 39 | 48 | 41 | 95 |
| D26 | 60° C. | 91 | 105 | 94 | 133 |
| D27 | 40° C. | 36 | 34 | 36 | 67 |
| D28 | room temperature | 34 | 38 | 34 | 66 |
| D29 | room temperature | 29 | 34 | 31 | 67 |
| D30 | 40° C. | 76 | 99 | 63 | 116 |
| D31 | 60° C. | 92 | 98 | 91 | 112 |
| D32 | 40° C. | 63 | 76 | 57 | 123 |
| D33 | 40° C. | 55 | 60 | 66 | 112 |
| D34 | room temperature | 28 | 24 | 22 | 34 |
| D35 | room temperature | 24 | 14 | 28 | 36 |
| D36 | room temperature | 48 | 35 | 45 | 49 |
| D37 | room temperature | 8 | 11 | 8 | 14 |
| C1 | 40° C. | 67 | 66 | 60 | 62 |

From the results above it is clear that all polymer films produced from acryloyloxy-functionalized polyurethanes with ADDH additive have an increased pendulum hardness at the latest after a storage time of 6 weeks—compared to the polymer films produced from the corresponding polyurethane dispersions without additive.

The polyurethane of comparative dispersion C1 does not have any acrylolyoxy groups. What is striking about the corresponding results is that in this case the film hardnesses of the polyurethane dispersion without additive are even higher than the corresponding film hardnesses of the polyurethane dispersion with ADDH additive, which can be explained, for example, by the inclusion of unreacted ADDH in the polymer film.

Use of Different Hydrazide Compounds

To this end, 0.5 g of Rheovis PE1330 and the appropriate hydrazide compounds were added at room temperature to 50 g of polyurethane dispersion D33 in each case. Immediately thereafter, the respective mixture was homogeneously mixed for 5 minutes at 3500 rpm using a Speedmixer DAC 150.1 FVZ. The hydrazide compounds used were 0.51 g of adipic acid dihydrazide (D33-1), 0.29 g of carbodihydrazide (D33-2), 0.57 g of isophthalic acid dihydrazide (D33-3) and 0.44 g of acethydrazide (D33-4). The mixture of 50 g of polyurethane dispersion D33 with 0.5 g of Rheovis PE1330 without added hydrazide was used as comparison (D33-C).

Immediately after their preparation, the aforementioned formulations D33-1 to D33-4 and D33-C were applied at room temperature to a grease-free glass plate using a 300 μm box-type coating bar. The resulting wet films were first dried for 30 minutes at room temperature and then for a further 30 minutes at 60° C. in a drying cabinet. The polymer films obtained were then stored in the climatically controlled room in the dark at room temperature and 60% relative humidity for the time period specified in Table 2. In this case, the film layer thicknesses obtained after drying and storage were in the range of 40 to 100 μm.

The König pendulum damping after drying and storage of the polymer films obtained from the formulations D33-1 to D33-4 and D33-C used was determined in accordance with DIN EN ISO 1522. The results obtained in this case are also given in Table 2.

TABLE 2

Results of the pendulum damping as a function of the carboxylic acid hydrazides used

| | Pendulum damping [s] | |
|---|---|---|
| Formulation | 3 days | 6 weeks |
| D33-1 | 15 | 87 |
| D33-2 | 22 | 90 |
| D33-3 | 15 | 48 |
| D33-4 | 16 | 64 |
| D33-C | 13 | 25 |

It can be clearly seen from the results obtained that all formulations to which a carboxylic acid hydrazide had been added form harder polymer films than formulation D33-C without additive.

The invention claimed is:

1. An aqueous binder formulation comprising:
   binder components comprising:
   a) at least one organic compound A, and
   b) at least one carboxylic acid hydrazide B, wherein the at least one organic compound A
   a1) has at least two optionally substituted acryloyloxy groups, and
   a2) does not comprise any aldehydic and/or ketonic carbonyl groups;
   wherein said formulation comprises ≥30% by weight water;
   wherein the aqueous binder formulation is configured to cure exclusively upon removal of the water;
   wherein the amounts of the at least one compound A and the at least one carboxylic acid hydrazide B are selected such that the equivalent molar ratio of the optionally substituted acryloyloxy groups of the at least one compound A to the hydrazide groups of the at least one carboxylic acid hydrazide B is in the range of ≥0.8 and ≤3.3.

2. The aqueous binder formulation according to claim 1, wherein the optionally substituted acryloyloxy groups have the following structure

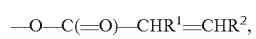

wherein
$R^1$ is hydrogen, $C_1$-$C_4$-alkyl, —C(=O)—O—$C_1$-$C_4$-alkyl or —CH$_2$—C(=O)—O—$C_1$-$C_4$-alkyl, and
$R^2$ is hydrogen, $C_1$-$C_4$-alkyl, —C(=O)—O—$C_1$-$C_4$-alkyl or —C≡N.

3. The aqueous binder formulation according to claim 1, wherein the at least one compound A is a polymeric compound.

4. The aqueous binder formulation according to claim 1, wherein the at least one carboxylic acid hydrazide B is the dihydrazide of an aliphatic dicarboxylic acid.

5. The aqueous binder formulation according to claim 1, wherein said formulation comprises ≤5% by weight organic solvent.

6. A process for producing an aqueous binder formulation according to claim 1, wherein an aqueous solution, emulsion and/or dispersion of the at least one compound A is produced in a first stage and the at least one carboxylic acid hydrazide B is added to this aqueous solution, emulsion and/or dispersion of the at least one compound A in a subsequent second stage.

7. A method of using the aqueous binder formulation according to claim 1, the method comprising using the aqueous binder formulation as a binder in the production of adhesives, sealants, renders, paper coating slips, fiber nonwovens, flexible roof coatings, printing inks and coating compositions and in sand consolidation, as a component in the production of textile or leather auxiliaries and impact modifiers or to modify mineral binders and plastics.

8. A method of using the aqueous binder formulation according to claim 1, the method comprising using the aqueous binder formulation as a binder for granular and/or fibrous substrates.

9. The aqueous binder formulation according to claim 1, wherein said formulation comprises a content of binder components, formed from the sum of the at least one organic compound A and the at least one carboxylic acid hydrazide B, in the range of ≥5 and ≤70% by weight.

10. The aqueous binder formulation according to claim 1, wherein the removal of the water comprises applying a temperature in a range of from about 0° C. to about 130° C.

11. The aqueous binder formulation according to claim 1, wherein the aqueous binder formulation does not comprise crosslinking agents.

12. The method of claim 8, further comprising producing a shaped body from the fibrous or granular substrate and drying the shaped body.

13. The method according to claim 12, wherein the drying the shaped body comprises drying the shaped body to a residual moisture content of ≤10% by weight.

14. The method according to claim 12, wherein the drying the shaped body comprises drying the shaped body to a residual moisture content of ≤3% by weight.

15. The method according to claim 12, wherein the drying the shaped body comprises drying the shaped body to a residual moisture content of ≤0.5% by weight.

16. The aqueous binder formulation according to claim 1, wherein the removal of the water results in a chemical reaction.

\* \* \* \* \*